US012522204B2

(12) United States Patent
Fujiwara

(10) Patent No.: US 12,522,204 B2
(45) Date of Patent: Jan. 13, 2026

(54) CONTROL DEVICE AND MOVING OBJECT

(71) Applicant: HONDA MOTOR CO., LTD., Tokyo (JP)

(72) Inventor: Tatsuro Fujiwara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 271 days.

(21) Appl. No.: 18/128,010

(22) Filed: Mar. 29, 2023

(65) Prior Publication Data
US 2023/0311658 A1 Oct. 5, 2023

(30) Foreign Application Priority Data

Mar. 30, 2022 (JP) .................................. 2022-057627
Sep. 30, 2022 (JP) .................................. 2022-158836

(51) Int. Cl.
*B60W 30/06* (2006.01)
*B60K 35/10* (2024.01)
(Continued)

(52) U.S. Cl.
CPC ............. *B60W 30/06* (2013.01); *B60K 35/10* (2024.01); *B60K 35/211* (2024.01);
(Continued)

(58) Field of Classification Search
CPC ...... B60K 2360/1438; B60K 2360/166; B60K 2360/171; B60K 2360/175; B60K 2360/176; B60K 2360/182; B60K 2360/184; B60K 2360/56; B60K 35/00; B60K 35/10; B60K 35/211; B60K 35/215;
(Continued)

(56) References Cited

U.S. PATENT DOCUMENTS

2018/0354556 A1 * 12/2018 Hirata .................. G06V 20/588

FOREIGN PATENT DOCUMENTS

DE  102009059866 A1 *  6/2011  ............. B60K 35/00
JP  2006-224778 A      8/2006
(Continued)

OTHER PUBLICATIONS

Mar. 26, 2024, Translation of Japanese Office Action issued for related JP Application No. 2022-158836.

*Primary Examiner* — Charles J Han
(74) *Attorney, Agent, or Firm* — Paratus Law Group, PLLC

(57) ABSTRACT

A control device includes a processing circuitry configured to: display, in the first display region of a display device mounted on a moving body, a top view image of the moving body and surrounding and a frame image indicating a place set as the target position; and display a predetermined image different from the top view image in the second display region of the display device when the top view image and the frame image are displayed. The processing circuitry is configured to: adjust, when a predetermined operation is performed on the displayed frame image, a display position of the frame image; display, when the frame image is displayed, an operation guide for guiding the predetermined operation in the second display region with the operation guide being superimposed on the predetermined image, and hide the operation guide after the predetermined operation is performed when the operation guide is displayed.

13 Claims, 9 Drawing Sheets

(51) Int. Cl.
*B60K 35/21* (2024.01)
*B60K 35/215* (2024.01)
*B60K 35/22* (2024.01)
*B60K 35/28* (2024.01)
*B60K 35/29* (2024.01)
*B60K 35/81* (2024.01)
*B60K 35/90* (2024.01)
B60K 35/26 (2024.01)
B60K 35/80 (2024.01)

(52) U.S. Cl.
CPC ............ *B60K 35/215* (2024.01); *B60K 35/22* (2024.01); *B60K 35/28* (2024.01); *B60K 35/29* (2024.01); *B60K 35/81* (2024.01); *B60K 35/90* (2024.01); B60K 35/265 (2024.01); B60K 35/80 (2024.01); B60K 2360/175 (2024.01); B60K 2360/176 (2024.01); B60K 2360/56 (2024.01)

(58) Field of Classification Search
CPC ...... B60K 35/22; B60K 35/265; B60K 35/28; B60K 35/29; B60K 35/80; B60K 35/81; B60K 35/90; B60W 2050/146
See application file for complete search history.

(56) References Cited

FOREIGN PATENT DOCUMENTS

| | | |
|---|---|---|
| JP | 2011-178272 A | 9/2011 |
| JP | 2014-193661 A | 10/2014 |
| JP | 2018-203214 A | 12/2018 |

\* cited by examiner

CONTROL DEVICE AND MOVING OBJECT

CROSS-REFERENCE TO RELATED APPLICATIONS

This application is based on and claims priority under 35 USC 119 from Japanese Patent Applications No. 2022-057627 filed on Mar. 30, 2022 and No. 2022-158836 filed on Sep. 30, 2022, the entire content of which is incorporated herein by reference.

TECHNICAL FIELD

The present invention relates to a control device and a moving body including the control device.

BACKGROUND ART

In recent years, efforts have been actively made to provide a sustainable transportation system in consideration of traffic participants in a vulnerable situation. As one of such efforts, research and development related to a driving assistance technology and an automatic driving technology for vehicles such as automobiles have been conducted to further improve safety and convenience of traffic.

For example, JP2014-193661A discloses a parking assistance device that presents a parking space setting frame superimposed on a top view image of a host vehicle, receives a first input for designating a first input point having a predetermined positional correlation with the parking space setting frame, and a second input for designating a second input point at a position different from that of the first input point, and changes and adjusts a position of the parking space setting frame with reference to the first input point according to a change in a relative position of the second input point with respect to the first input point.

However, in the related art, there is room for improvement in terms of effectively utilizing a limited display region of a display device and presenting information necessary for a user to the user in an easy-to-understand manner.

An aspect of the present disclosure relates to provide a control device capable of effectively utilizing a limited display region of a display device and presenting information necessary for a user to the user in an easy-to-understand manner, and a moving body including the control device.

SUMMARY OF INVENTION

According to an aspect of the present disclosure, there is provided a control device for controlling a display device mounted on a moving body, the moving body being configured to move to a target position designated by a user by automatic steering, the display device including a first display region and a second display region adjacent to the first display region, the control device including a processing circuitry configured to: display, in the first display region, a top view image of the moving body and surrounding of the moving body and a frame image indicating a place set as the target position, the top view image being generated based on a surrounding image obtained by capturing an image of the surrounding of the moving body; and display a predetermined image different from the top view image in the second display region when the top view image and the frame image are displayed. The processing circuitry is configured to: adjust, when a predetermined operation is performed on the displayed frame image, a display position of the frame image according to the operation; display, when the frame image is displayed, an operation guide for guiding the predetermined operation in the second display region with the operation guide being superimposed on the predetermined image, and hide the operation guide after the predetermined operation is performed when the operation guide is displayed.

DESCRIPTION OF EMBODIMENTS

Figure 1:
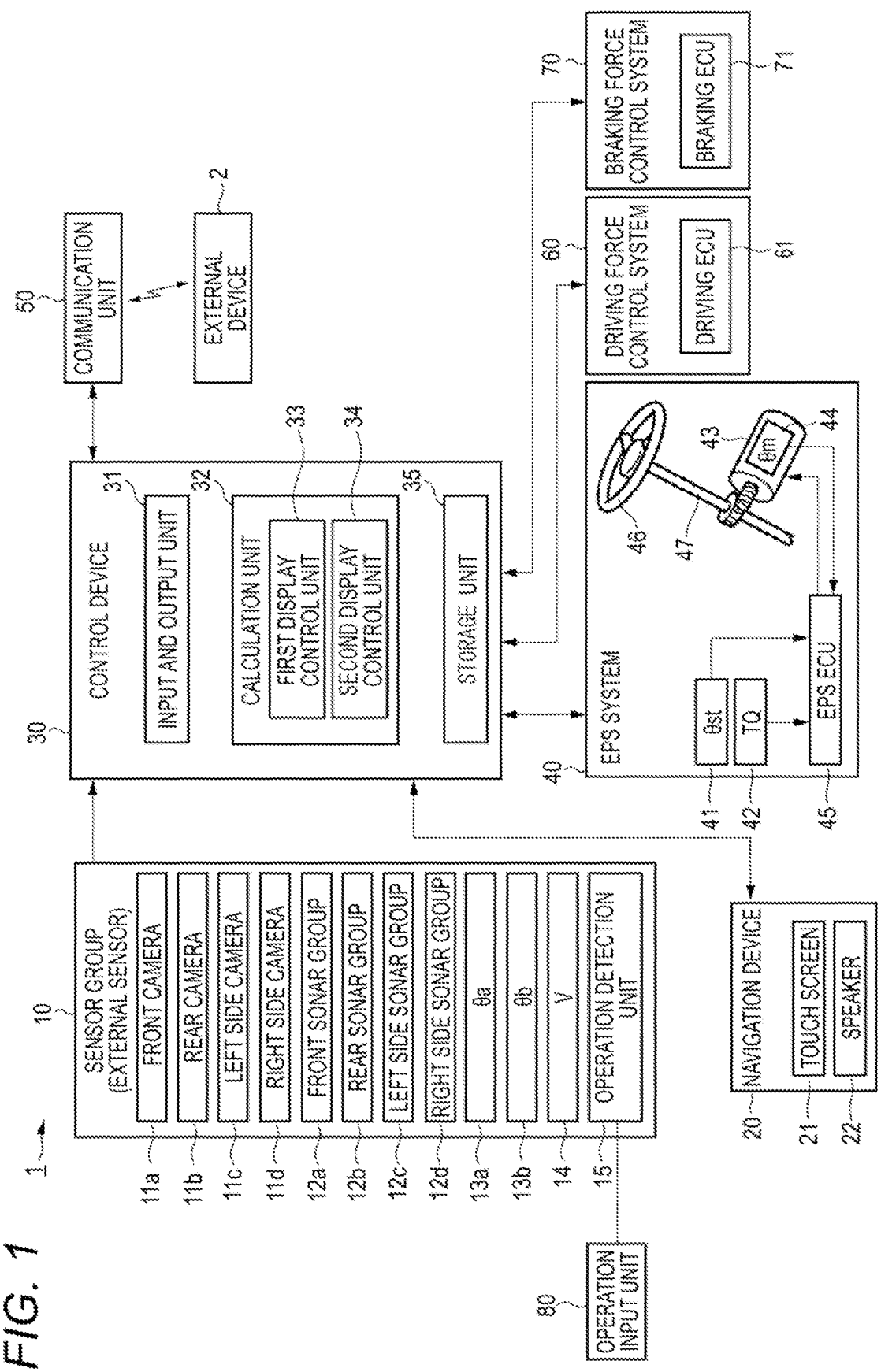
FIG. 1 is a block diagram illustrating a schematic configuration of a vehicle including a control device according to a first embodiment.

Hereinafter, embodiments of a control device according to the present invention and a moving object including the control device will be described in detail with reference to the drawings. In the following description, the embodiments in which the moving object according to the present invention is a vehicle will be described. In the present specification, to simplify and clarify the description, directions such as front, rear, left, right, up, and down are described according to directions viewed from a driver of the vehicle. In addition, in the following description, the same or similar elements are denoted by the same or similar reference numerals, and the description thereof may be omitted or simplified as appropriate.

First Embodiment

[Vehicle]

First, a first embodiment according to the present invention will be described. A vehicle 1 according to the first embodiment illustrated in FIG. 1 is an automobile including a drive source and wheels (none of which is illustrated) including drive wheels driven by power of the drive source and steered wheels. For example, the vehicle 1 is a four-wheel automobile having a pair of left and right front wheels and a pair of left and right rear wheels. The drive source of the vehicle 1 may be an electric motor, an internal combustion engine such as a gasoline engine or a diesel engine, or a combination of the electric motor and the internal combustion engine. Further, the drive source of the vehicle 1 may drive the pair of left and right front wheels, the pair of left and right rear wheels, or a pair of left and right front wheels and rear wheels. One of the front wheels and the rear wheels may be the steering wheels, or both may be the steered wheels.

The vehicle 1 can be moved to a target position designated by a user by automatic steering. As the target position, a position at which the vehicle 1 is parked (hereinafter, also simply referred to as a "parking position") can be set. That is, the vehicle 1 can be parked by the automatic steering at the parking position designated by the user. At this time, for example, the vehicle 1 moves to the parking position in a parking pattern selected by the user from a plurality of types of parking patterns. Here, the parking pattern defines a movement mode when the vehicle 1 moves to the parking position. Examples of the plurality of types of parking patterns include a forward parking pattern in which the vehicle 1 is parked forward with respect to the parking position which is the target position, a backward parking pattern in which the vehicle 1 is parked backward with respect to the parking position which is the target position, and a parallel parking pattern in which the vehicle 1 is parked in parallel with respect to the parking position which is the target position.

As illustrated in FIG. 1, the vehicle 1 includes a sensor group 10, a navigation device 20, a control device 30, an electric power steering system (EPS system) 40, a communication unit 50, a driving force control system 60, and a braking force control system 70.

The sensor group 10 acquires various detection values related to the vehicle 1 or surrounding of the vehicle 1. The detection values acquired by the sensor group 10 are provided for, for example, the automatic parking of the vehicle 1. Here, the automatic parking means parking the vehicle by the automatic steering at the parking position designated by the user.

The sensor group 10 includes a front camera 11a, a rear camera 11b, a left side camera 11c, a right side camera I1d, a front sonar group 12a, a rear sonar group 12b, a left side sonar group 12c, and a right side sonar group 12d. The cameras and the sonar groups may function as an external sensor that acquires surrounding information on the vehicle 1.

The front camera 11a, the rear camera 11b, the left side camera 11c, and the right side camera I1d output image data of surrounding images obtained by capturing images of the surrounding of the vehicle 1 to the control device 30. The surrounding images captured by the front camera 11a, the rear camera 11b, the left side camera 11c, and the right side camera I1d are referred to as a front image, a rear image, a left side image, and a right side image, respectively. An image formed by the left side image and the right side image is also referred to as a side image.

The front sonar group 12a, the rear sonar group 12b, the left side sonar group 12c, and the right side sonar group 12d emit sound waves to the surrounding of the vehicle 1 and receive reflected sounds from other objects. The front sonar group 12a includes, for example, four sonars. The sonars constituting the front sonar group 12a are respectively provided on an obliquely left front side, a front left side, a front right side, and an obliquely right front side of the vehicle 1. The rear sonar group 12b includes, for example, four sonars. The sonars constituting the rear sonar group 12b are respectively provided on an obliquely left rear side, a rear left side, a rear right side, and an obliquely right rear side of the vehicle 1. The left side sonar group 12c includes, for example, two sonars. The sonars constituting the left side sonar group 12c are respectively provided at a front side of a left side portion and a rear side of a left side portion of the vehicle 1. The right side sonar group 12d includes, for example, two sonars. The sonars constituting the right side sonar group 12d are respectively provided at a front side of a right side portion and a rear side of a right side portion of the vehicle 1.

The sensor group 10 further includes wheel sensors 13a and 13b, a vehicle speed sensor 14, and an operation detection unit 15. The wheel sensors 13a and 13b detect rotation angles θa and Ob of wheels (not illustrated), respectively. The wheel sensors 13a and 13b may be implemented by angle sensors or may be implemented by displacement sensors. The wheel sensors 13a and 13b output detection pulses each time the wheels rotate by predetermined angles. The detection pulses output from the wheel sensors 13a and 13b can be used to calculate rotation angles of the wheels and a rotation speed of the wheels. A movement distance of the vehicle 1 can be calculated based on the rotation angle of the wheels. The wheel sensor 13a detects, for example, the rotation angle θa of the left rear wheel. The wheel sensor 13b detects, for example, the rotation angle θb of the right rear wheel.

The vehicle speed sensor 14 detects a travel speed of a vehicle body (not illustrated) of the vehicle 1, that is, a vehicle speed V, and outputs the detected vehicle speed V to the control device 30. The vehicle speed sensor 14 detects the vehicle speed V based on, for example, rotation of a countershaft of a transmission.

The operation detection unit 15 detects an operation content of an operation performed by the user by using an operation input unit 80, and outputs the detected operation content to the control device 30. The operation input unit 80 may include, for example, an operation button that receives an operation for executing the automatic parking. The operation input unit 80 may be shared with a touch panel 21 to be described later. Further, the operation input unit 80 may include a shift lever (a select lever, a selector) that is used when switching between forward movement and backward movement of the vehicle 1 is performed.

The navigation device 20 detects a current position of the vehicle 1 by using, for example, a global positioning system (GPS) and guides the user along a route to a destination. The navigation device 20 includes a storage device (not illustrated) provided with a map information database.

The navigation device 20 includes the touch panel 21 and a speaker 22. The touch panel 21 functions as an input device that receives an input of various types of information to the control device 30 and as a display device controlled by the control device 30. That is, the user can input various commands to the control device 30 via the touch panel 21. Further, various screens are displayed on the touch panel 21.

The speaker 22 outputs various types of guidance information to the user by voice. For example, during the automatic parking, voice guidance may be performed via the speaker 22. Specifically, when the movement by the automatic steering to the parking position designated by the user is started, the start of the movement of the vehicle 1 may be performed by the voice guidance via the speaker 22.

The control device 30 integrally controls the entire vehicle 1. The control device 30 includes, for example, an input and output unit 31, a calculation unit 32, and a storage unit 35. The input and output unit 31 is an interface that inputs and outputs data between an inside and an outside of the control device 30 under control of the calculation unit 32. The storage unit includes, for example, a non-volatile storage medium such as a flash memory, and stores various types of information (for example, data and programs) for controlling an operation of the vehicle 1.

The calculation unit 32 is implemented by, for example, a central processing unit (CPU) or the like, and controls components of the vehicle 1 by executing programs stored in the storage unit 35. Accordingly, the automatic parking is implemented. For example, the calculation unit 32 executes the automatic parking when receiving an operation for executing the automatic parking via the input and output unit 31.

For example, the calculation unit 32 includes a first display control unit 33 and a second display control unit 34 that control the display device (here, the touch panel 21) included in the vehicle 1. For example, the first display control unit 33 and the second display control unit 34 may display an automatic parking related screen PS to be described later on the touch panel 21 in response to the reception of the operation for executing the automatic parking. Since the first display control unit 33 and the second display control unit 34 will be described later again, a detailed description thereof will be omitted here.

The EPS system 40 includes a steering angle sensor 41, a torque sensor 42, an EPS motor 43, a resolver 44, and an EPS electronic control unit (EPS ECU) 45. The steering angle sensor 41 detects a steering angle θst of a steering 46. The torque sensor 42 detects a torque TQ applied to the steering 46.

The EPS motor 43 enables operation assistance of the steering 46 by the driver and the automatic steering during the automatic parking by applying a driving force or a reaction force to a steering column 47 coupled to the steering 46. The resolver 44 detects a rotation angle θm of the EPS motor 43. The EPS ECU 45 controls the entire EPS system 40. The EPS ECU 45 includes an input and output unit, a calculation unit, and a storage unit (none of which is illustrated).

The communication unit 50 is a communication interface that communicates with an external device 2 provided outside the vehicle 1 under the control of the control device 30. That is, the control device 30 may communicate with the external device 2 via the communication unit 50. For example, a mobile communication network such as a cellular line, Wi-Fi (registered trademark), or Bluetooth (registered trademark) can be used for the communication between the vehicle 1 and the external device 2. The external device 2 is managed by, for example, a manufacturer of the vehicle 1. The external device 2 may be a virtual server (cloud server) implemented in a cloud computing service, or may be a physical server implemented as a single device.

The driving force control system 60 includes a driving ECU 61. The driving force control system 60 executes driving force control of the vehicle 1. The driving ECU 61 controls a driving force of the vehicle 1 by controlling an engine or the like (not illustrated) based on an operation of an accelerator pedal (not illustrated) by the user or an instruction from the control device 30.

The braking force control system 70 includes a braking ECU 71. The braking force control system 70 executes braking force control of the vehicle 1. The braking ECU 71 controls a braking force of the vehicle 1 by controlling a brake mechanism or the like (not illustrated) based on an operation of a brake pedal (not illustrated) by the user.

[Screen Related to Automatic Parking]

Next, regarding the automatic parking, a specific example of a display screen that can be displayed on the touch panel 21 according to the control of the control device 30 will be described with reference to FIGS. 2 to 4.

Figure 2:
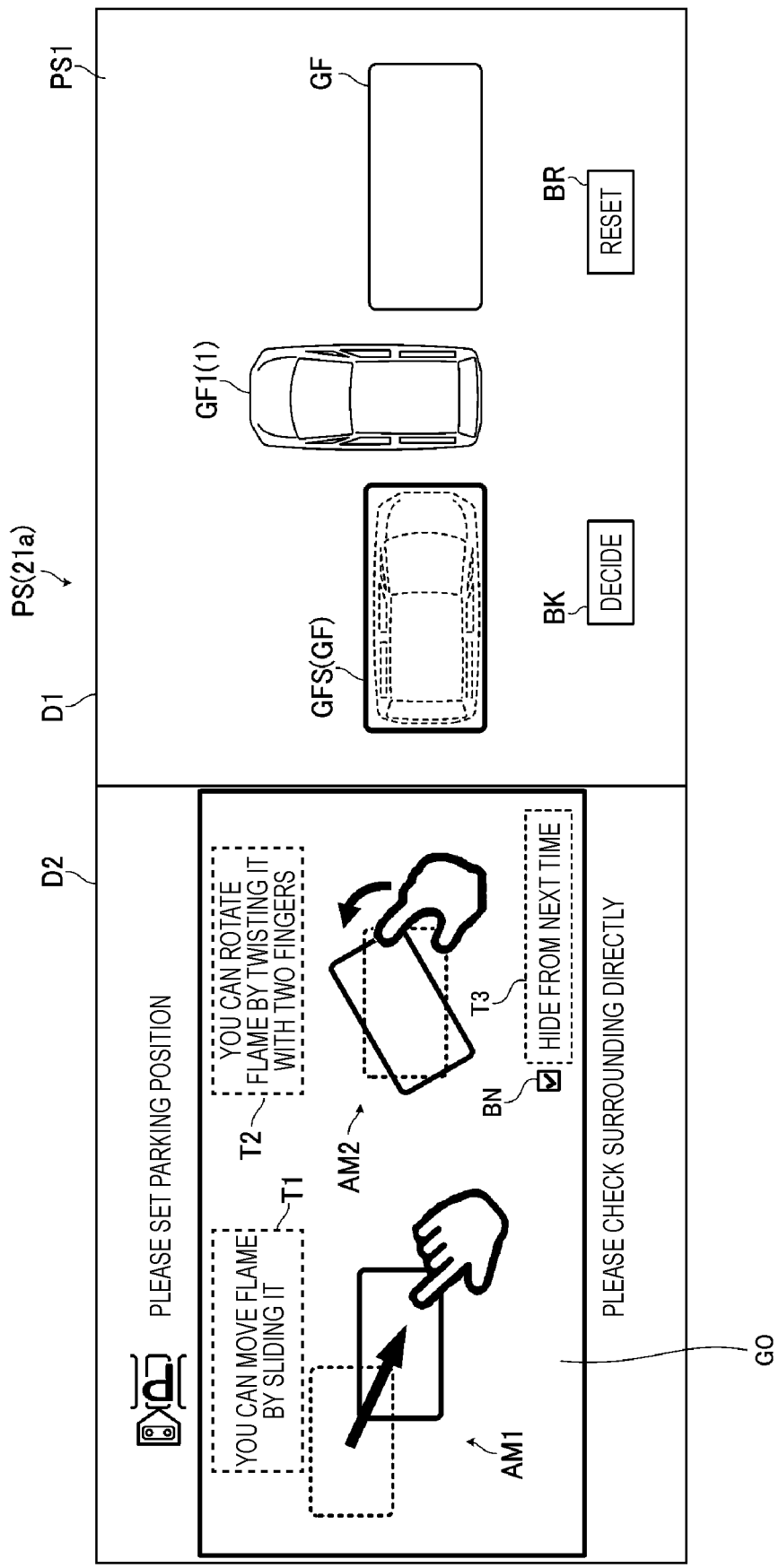
FIG. 2 is a diagram (part 1) illustrating an example of an automatic parking related screen displayed by the control device according to the first embodiment in relation to automatic parking.
Figure 3:
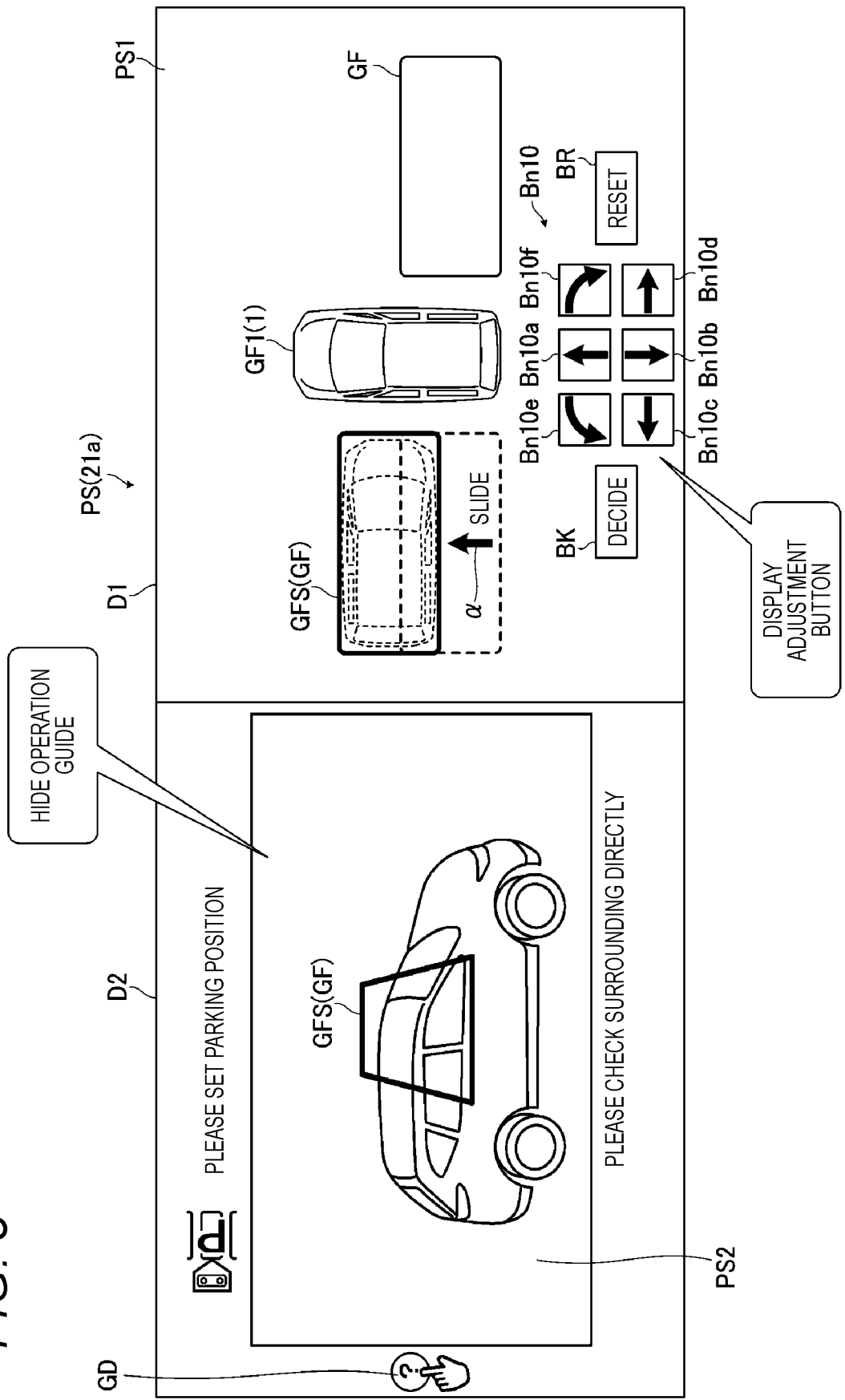
FIG. 3 is a diagram (part 2) illustrating an example of the automatic parking related screen displayed by the control device according to the first embodiment in relation to the automatic parking.
Figure 4:
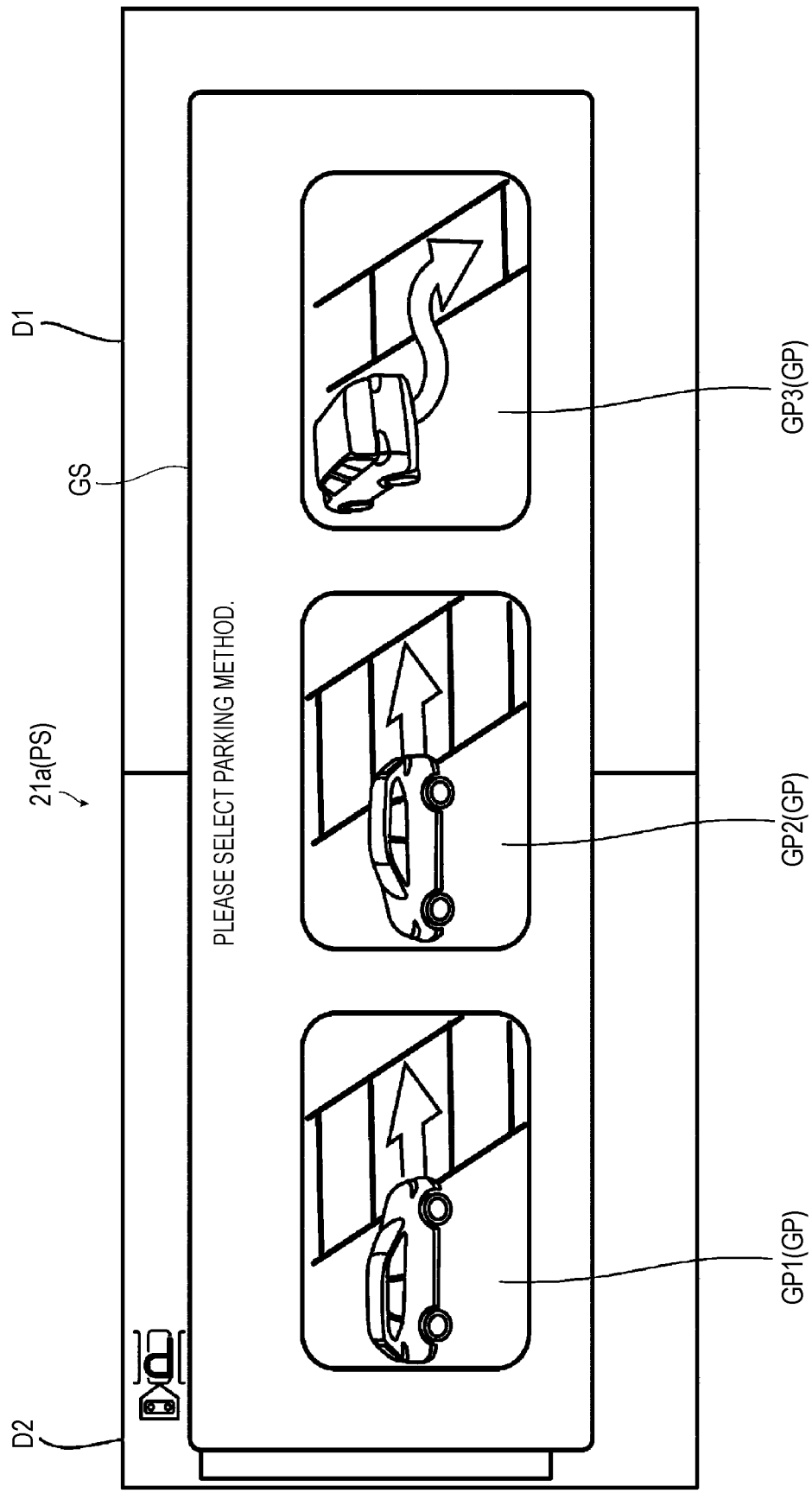
FIG. 4 is a diagram (part 3) illustrating an example of the automatic parking related screen displayed by the control device according to the first embodiment in relation to the automatic parking.

As illustrated in FIGS. 2 to 4, the touch panel 21 includes a rectangular and horizontally long display region 21a. A right half region of the display region 21a is used as a first display region D1, and a left half region of the display region 21a is used as a second display region D2.

In the display region 21a of the touch panel 21, for example, a screen related to the automatic parking (hereinafter also referred to as "automatic parking related screen PS") is displayed. The automatic parking related screen PS may include various images for the user to perform various settings and the like related to the automatic parking. Although details will be described later, for example, the automatic parking related screen PS may include a top view image PS1, candidate position images (frame images) GF, an adjustment button group image (hereinafter simply referred to as an "adjustment button group") GB, a direction image PS2, an operation guide image (hereinafter simply referred to as an "operation guide") GO, a display button image (hereinafter simply referred to as a "display button") GD, a decision button image (hereinafter simply referred to as a "decision button") BK, a reset button image (hereinafter simply referred to as a "reset button") BR, a parking method selection image GS, and the like.

[Image Displayable in First Display Region]

First, images that can be displayed in the first display region D1 will be described. As illustrated in FIGS. 2 and 3, the top view image PS1, the candidate position image GF, the adjustment button group GB, the decision button BK, the reset button BR, and the like can be displayed in the first display region D1.

The top view image PS1 is an image obtained by viewing the vehicle 1 and the surrounding thereof from directly above, and includes a host vehicle image GF1 as an image indicating the vehicle 1. The top view image PS1 is generated based on, for example, the surrounding image obtained by capturing the image of the surrounding of the vehicle 1. The candidate position image GF is an image indicating a parking candidate position that is a candidate for the parking position, and is, for example, the frame image indicating an outline of the parking candidate position. For example, the candidate position image GF is displayed to be superimposed on the top view image PS1. In examples illustrated in FIGS. 2 and 3, the candidate position images GF are displayed on the left and right of the host vehicle image GF1 in the top view image PS1. The user can select the candidate position image GF by tapping either of the candidate position images GF (lightly tapping the screen with a finger).

For example, the selected candidate position image GF is highlighted to be distinguishable from the other candidate position images GF (that is, the unselected candidate position image GF). The selected candidate position image GF is hereinafter also referred to as a "selected candidate position image GFS". The selected candidate position image GFS is the frame image indicating the parking position set as the target position when the vehicle 1 is parked by the automatic parking.

Examples of a mode in which the selected candidate position image GFS is highlighted include a mode in which a thickness of an outline of the selected candidate position image GFS is set to be thicker than that of the other candidate position image GF, and a mode in which a display color of the outline of the selected candidate position image GFS is set to be different from that of the other candidate position image GF. In a frame in which the selected candidate position image GFS is displayed, for example, an image representing the vehicle 1 is displayed in a translucent state. Based on the image of the vehicle 1 displayed in the frame of the selected candidate position image GFS (see broken lines in the frame of the selected candidate position image GFS in FIGS. 2 and 3), the user can be guided on how the vehicle 1 is parked at a position indicated by the selected candidate position image GFS in an easy-to-understand manner.

As illustrated in FIG. 3, the adjustment button group GB is an operation button group for adjusting a position and an angle of the selected candidate position image GFS, and includes an up button Bn10a, a down button Bn10b, a left button Bn10c, a right button Bn10d, a left rotation button Bn10e, and a right rotation button Bn10f. In the example illustrated in FIG. 3, the adjustment button group GB is displayed at a center of a lower end of the first display region D1. In the following description, the up button Bn10a, the down button Bn10b, the left button Bn10c, the right button Bn10d, the left rotation button Bn10e, and the right rotation button Bn10f are collectively referred to as "adjustment buttons".

The candidate position image GF can be moved upward, downward, leftward, and rightward or rotated in the first display region D1 by performing a touch operation on the candidate position image GF or by tapping the adjustment buttons of the adjustment button group GB. The touch operation on the candidate position image GF includes a swipe (an operation of moving one finger upward, downward, leftward, and rightward while keeping the screen touched with the finger) and a multiswipe (an operation of simultaneously moving two or more fingers upward, downward, leftward, and rightward while keeping the screen touched with the fingers).

For example, the user can perform a slide operation on any candidate position image GF by swiping the candidate position image GF. Further, for example, the user can perform a rotation operation on any candidate position image GF by performing the multiswipe on the candidate position image GF.

The decision button BK illustrated in FIGS. 2 and 3 is an operation button image for deciding (setting) the position indicated by the selected candidate position image GFS as the parking position. The reset button BR is an operation button image for resetting all operations performed on the candidate position image GF (in other words, returning the candidate position image GF to an original position and angle). In the examples illustrated in FIGS. 2 and 3, the decision button BK is displayed at a position near the lower end and near a left end of the first display region D1, and the reset button BR is displayed at a position near the lower end and near a right end of the first display region D1.

[Image Displayable in Second Display Region]

Next, images that can be displayed in the second display region D2 will be described. As illustrated in FIGS. 2 and 3, the direction image PS2, the operation guide GO, the display button GD, and the like can be displayed in the second display region D2.

As illustrated in FIG. 3, the direction image PS2 is a three-dimensional image virtually illustrating a space including the vehicle 1 and the surrounding thereof. A viewpoint position of the direction image PS2 is set such that the direction image PS2 is an image including a landscape in a predetermined direction (for example, forward or lateral direction) of the vehicle 1. For example, the predetermined direction is set based on a positional correlation between the vehicle 1 and the position indicated by the selected candidate position image GFS, and more specifically, as illustrated in FIG. 3, the predetermined direction is set to a direction in which the position indicated by the selected candidate position image GFS is viewed from the vehicle 1. For example, the direction image PS2 is generated by performing image processing of three-dimensionally reconstructing a composite image obtained by combining the surrounding images captured by the front camera 30a, the rear camera 30b, the left side camera 30c, and the right side camera 30d.

In this way, since the direction image PS2 is displayed in the second display region D2 in addition to the top view image PS1 displayed in the first display region D1, it is possible to guide the user to the surrounding of the vehicle 1 in an easy-to-understand manner.

As illustrated in FIG. 2, the operation guide GO is an image for guiding the user to perform the touch operation on the candidate position image GF, and includes, for example, animations AM1 and AM2 indicating that the candidate position image GF can be slid or rotated by swiping or multiswiping the candidate position image GF and explanatory texts T1 and T2 for the animations AM1 and AM2.

Here, the animations AM1 and AM2 and the explanatory texts T1 and T2 are included in the operation guide GO from a viewpoint of ease of understanding to the user, but are not limited thereto. For example, a still image indicating that the candidate position image GF can be slid or rotated by swiping or multiswiping the candidate position image GF may be included in the operation guide GO instead of the animations AM1 and AM2. Further, for example, when it is considered that the user is sufficiently notified that the candidate position image GF can be slid or rotated by swiping or multiswiping the candidate position image GF by the animations AM1 and AM2 or the still image instead thereof, the explanatory texts T1 and T2 may be omitted.

As illustrated in FIG. 2, the operation guide GO further includes a hidden setting button BN for hiding the operation guide GO from a next time and an explanatory text T3 thereof. In the example illustrated in FIG. 2, the hidden setting button BN is a check box, but is not limited thereto. The hidden setting button BN may be, for example, a radio button or the like.

As illustrated in FIG. 3, the display button GD is an operation button image for receiving an operation for displaying the operation guide GO, and is displayed, for example, near the direction image PS2 in the second display region D2. The user can cause the operation guide GO illustrated in FIG. 2 to be displayed in the second display region D2 each time by appropriately operating the display button GD.

Next, the parking method selection image GS that can be displayed across the first display region D1 and the second display region D2 will be described. As illustrated in FIG. 4, the parking method selection image GS is displayed across the first display region D1 and the second display region D2. The parking method selection image GS includes, for example, a parking pattern image GP1 indicating a forward parking pattern, a parking pattern image GP2 indicating a backward parking pattern, and a parking pattern image GP3 indicating a parallel parking pattern as parking pattern images GP. For example, by tapping any one of the parking pattern images GP1. GP2, and GP3 to select the parking pattern, the user can set the position indicated by the selected candidate position image GFS as the parking position and instruct the control device 30 to park the vehicle in the selected parking pattern at the parking position.

Example of Calculation Unit Included in Control Device

Next, an example of the calculation unit 32 included in the control device 30 will be described. As illustrated in FIG. 1, the calculation unit 32 includes the first display control unit 33 and the second display control unit 34. The first display control unit 33 and the second display control unit 34 control the touch panel 21 to display the automatic parking related screen PS in the display region 21a.

The first display control unit 33 displays the top view image PS1 and the candidate position image GF in the first display region D1 (for example, referring to FIGS. 2 and 3). Further, for example, the first display control unit 33 enables the touch operation on the candidate position image GF or adjustment of the display position of the candidate position image GF using the adjustment button group GB on a condition that the vehicle 1 stops (that is, the vehicle speed V=0). Accordingly, the user can be prevented from performing the operation of adjusting the display position of the candidate position image GF during the movement of the vehicle 1, and the safety of the vehicle 1 can be improved.

When the touch operation (for example, a tap, a swipe, or the like) is performed on the candidate position image GF, the first display control unit 33 adjusts the display position of the candidate position image GF according to the touch operation (for example, referring to an arrow of reference sign a in FIG. 3). Further, for example, the first display control unit 33 hides the adjustment button group GB when the operation guide GO is displayed as illustrated in FIG. 2, and displays the adjustment button group GB when the operation guide GO is hidden as illustrated in FIG. 3. Accordingly, as compared with a case where both the adjustment button group GB and the operation guide GO is displayed, it is possible to make it easier for the user to pay attention to the operation guide GO when the operation guide GO is displayed.

When the top view image PS1 and the candidate position image GF are displayed, the second display control unit 34 can display the direction image PS2 in the second display region D2 (for example, referring to FIG. 3). For example, when the top view image PS1 and the candidate position image GF are displayed as illustrated in FIG. 2, the second display control unit 34 first displays the operation guide GO in the second display region D2 to be superimposed on the direction image PS2. When the slide operation or the rotation operation is performed on the candidate position image GF while the operation guide GO is displayed, the second display control unit 34 hides the operation guide GO as illustrated in FIG. 3. In other words, the second display control unit 34 hides the operation guide GO after a predetermined operation such as the slide operation or the rotation operation is performed on the candidate position image GF when the operation guide GO is displayed.

In this way, the operation guide GO is displayed until the operation on the candidate position image GF is performed, the operation guide GO is hidden when the operation on the candidate position image GF is performed, and therefore the limited display region of the touch panel 21 is effectively utilized and the information necessary for the user can be presented to the user in an easy-to-understand manner. Further, when either of the slide operation and the rotation operation guided by the operation guide GO is performed, the operation guide GO is hidden, and therefore when it is considered that the user knows the operation on the candidate position image GF, the candidate position image GF can be hidden.

As illustrated in FIG. 3, when the candidate position image GF is displayed and the operation guide GO is hidden, the second display control unit 34 displays the display button GD in the second display region D2 such that the user can operate the display button GD. When the display button GD is operated by the user, the second display control unit 34 displays the operation guide GO in the second display region D2 as illustrated in FIG. 2.

Accordingly, the user can check the operation guide GO as necessary.

When the hidden setting button BN is turned on, that is, when the check box is checked, the second display control unit 34 does not display the operation guide GO. Accordingly, the operation guide GO can be prevented from being displayed against the user's intention.

Example of Processing Executed by Control Unit

Next, an example of processing executed by the control device 30 in relation to the automatic parking will be described with reference to FIGS. 2 to 7. For example, when there is an operation to execute the automatic parking, the control device 30 executes the processing illustrated in FIGS. 5 to 7. For example, when the vehicle speed V becomes zero during the execution of the processing illustrated in FIGS. 5 to 7, the control device 30 interrupts the processing illustrated in FIGS. 5 to 7 at that time.

Figure 5:
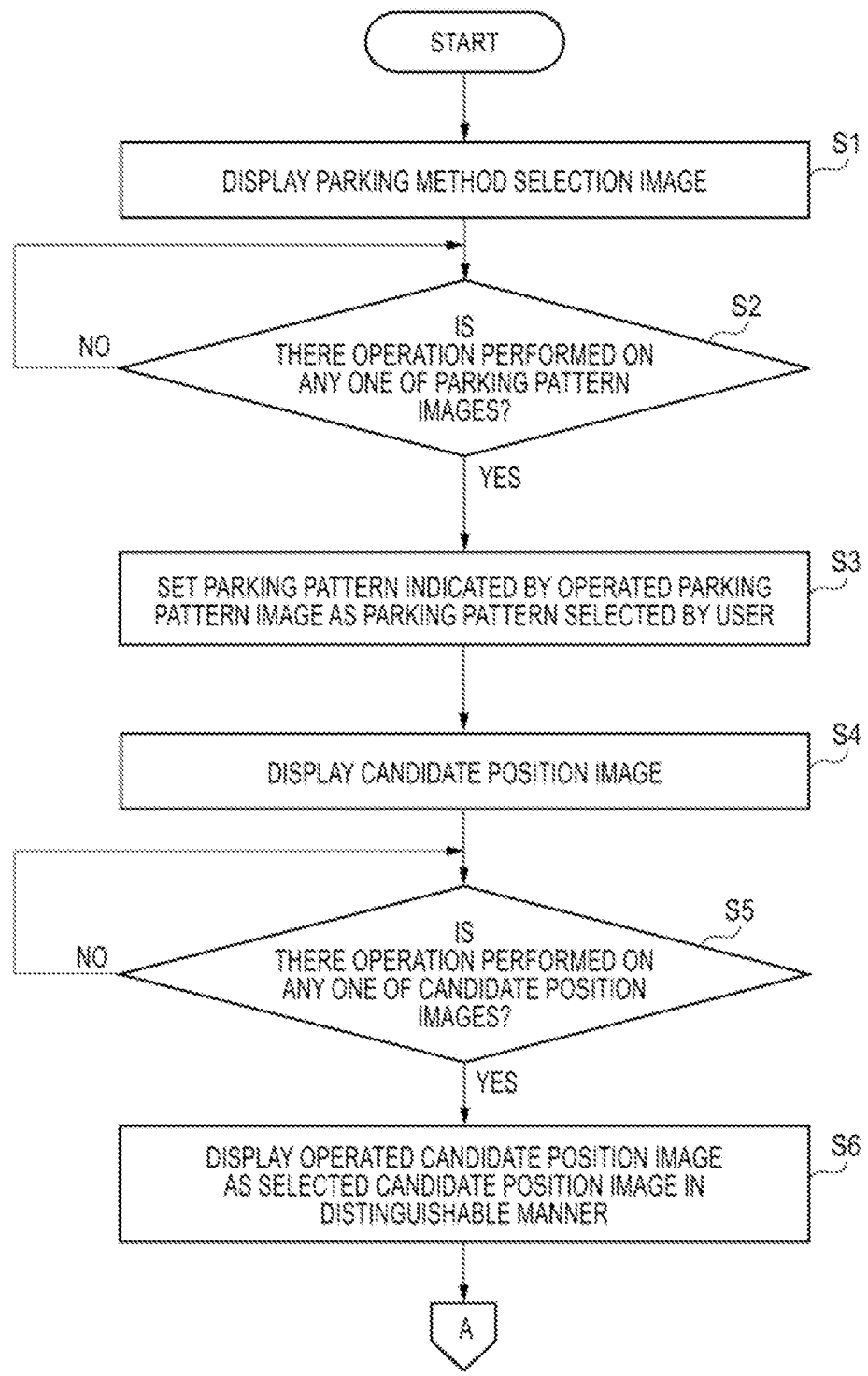
FIG. 5 is a diagram (part 1) illustrating an example of processing performed by the control device according to the first embodiment in relation to the automatic parking.

As illustrated in FIG. 5, the control device 30 first displays the parking method selection image GS illustrated in FIG. 4 on the touch panel 21 (step S1) Accordingly, the user can select a desired parking pattern by performing the touch operation on any one of the parking pattern images GP displayed on the touch panel 21, that is, the parking pattern image GP1 indicating the forward parking pattern, the parking pattern image GP2 indicating the backward parking pattern, and the parking pattern image GP3 indicating the parallel parking pattern.

Next, the control device 30 determines whether there is an operation performed on any one of the parking pattern images GP (step S2). When the control device 30 determines that there is an operation performed on any one of the parking pattern images GP (Yes in step S2), the control device 30 sets the parking pattern indicated by the operated parking pattern image GP as the parking pattern selected by the user (step S3).

Next, the control device 30 displays the candidate position image GF on the touch panel 21 (step S4). At this time, for example, the control device 30 displays the candidate position image GF at a position corresponding to the parking pattern selected by the user at an angle corresponding to the parking pattern. More specifically, for example, when the forward parking pattern or the backward parking pattern is selected, the control device 30 displays the candidate position images GF whose longitudinal direction is orthogonal to a longitudinal direction of the host vehicle image GF1 on both left and right sides of the host vehicle image GF1 in the top view image PS1. Further, when the parallel parking pattern is selected, the control device 30 displays the candidate position images GF whose longitudinal direction is parallel to the longitudinal direction of the host vehicle image GF1 on both left and right sides of the host vehicle image GF1 in the top view image PS1. When the candidate position image GF is displayed on the touch panel 21 in this way, the control device 30 determines whether there is an operation performed on any one of the candidate position images GF (step S5). When the control device 30 determines that there is an operation performed on any one of the candidate position images GF (Yes in step S5), the control device 30 displays the operated candidate position image GF as the selected candidate position image GFS as illustrated in FIG. 2 in a distinguishable manner (step S6).

Figure 6:
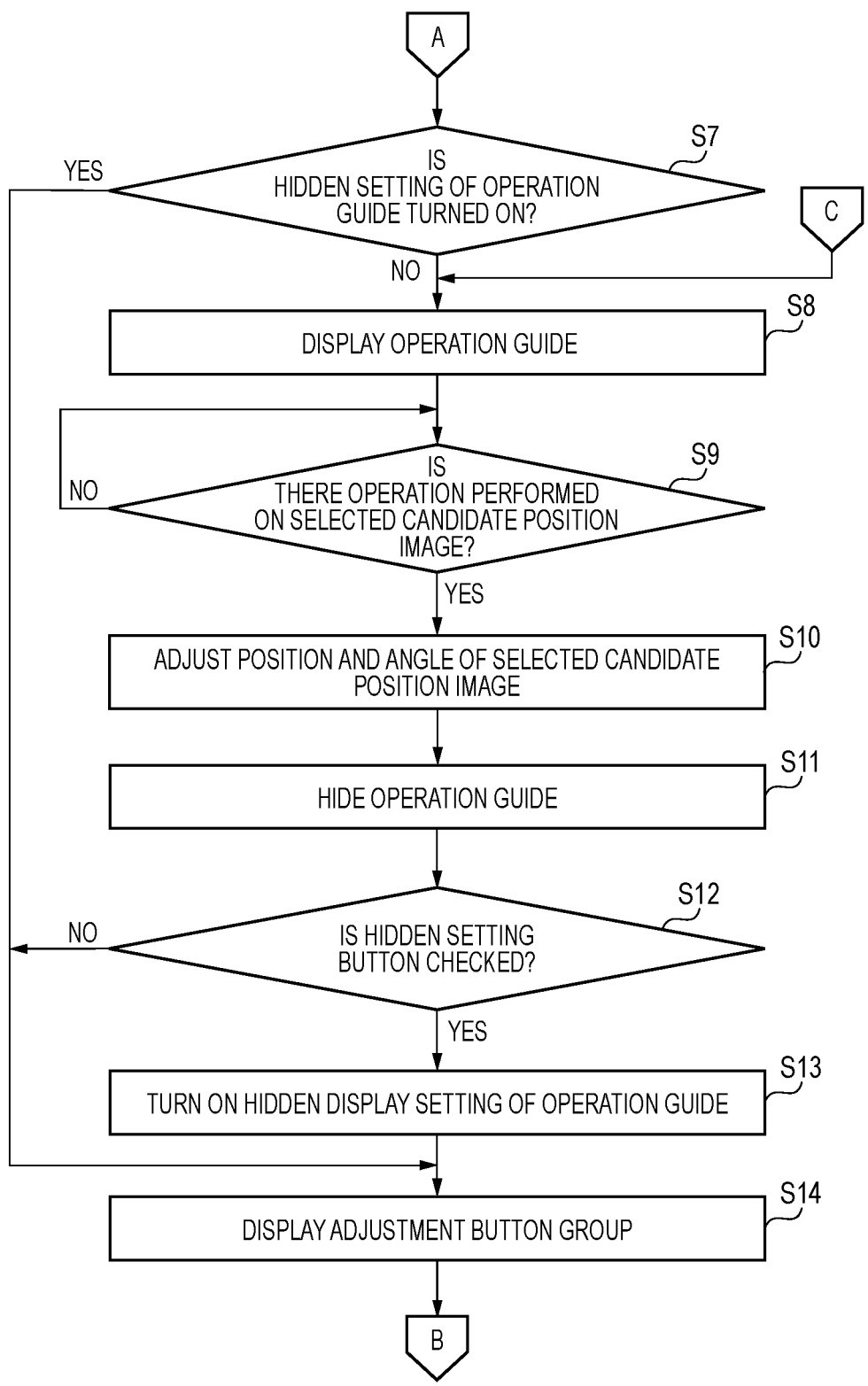
FIG. 6 is a diagram (part 2) illustrating an example of the processing performed by the control device according to the first embodiment in relation to the automatic parking.

Then, as illustrated in FIG. 6, the control device 30 determines whether a hidden setting of the operation guide GO is turned on, that is, whether the hidden setting button BN is turned on before (step S7). When the hidden setting of the operation guide GO is not turned on (No in step S7), the control device 30 displays the operation guide GO in the second display region D2 to be superimposed on the direction image PS2 as illustrated in FIG. 2 (step S8).

Next, the control device 30 determines whether there is an operation performed on the selected candidate position image GFS (step S9). When the control device 30 determines that there is an operation performed on the selected candidate position image GFS (Yes in step S9), the control device 30 adjusts the position and the angle of the selected candidate position image GFS (step S10). For example, when there is a slide operation by the swipe, the control device 30 slides (moves in parallel) the selected candidate position image GFS, and when there is a rotation operation by the multiswipe, and the control device 30 rotates the selected candidate position image GFS.

Then, as illustrated in FIG. 3, the control device 30 hides the operation guide GO (step S11). Accordingly, in the second display region D2 of the touch panel 21, the direction image PS2 and the display button GD are visible to the user. When the decision button BK is operated without any operation performed on the selected candidate position image GFS, for example, the control device 30 may immediately proceed to processing of step S20 to be described later.

Next, the control device 30 determines whether the hidden setting button BN of the operation guide GO is checked (step S12). When the hidden setting button BN is checked (Yes in step S12), the control device 30 turns on the hidden setting of the operation guide GO (step S13) such that the operation guide GO is not displayed against the user's will from the next time. Next, the control device 30 displays the adjustment button group GB on the touch panel 21 (step S14).

Figure 7:
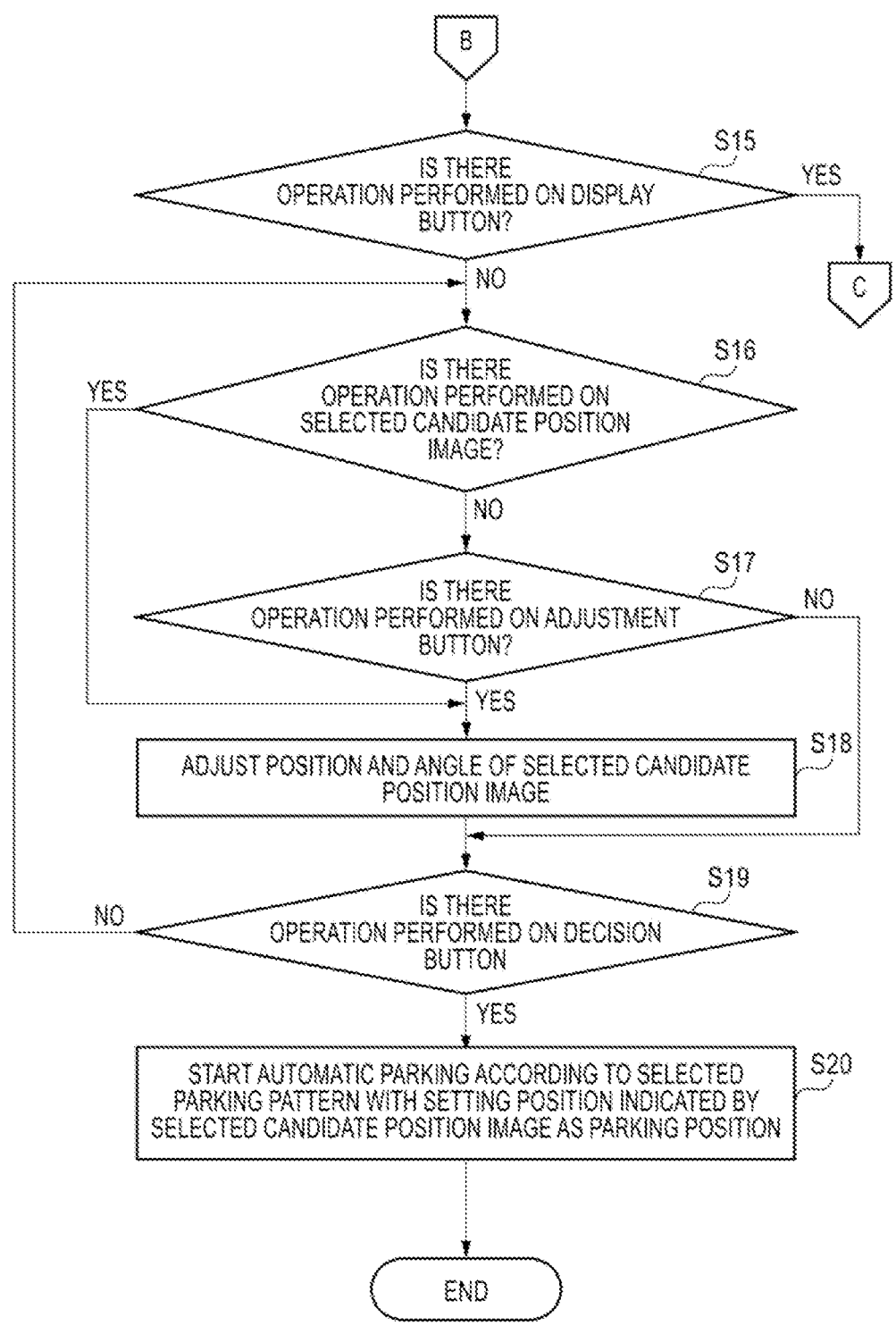
FIG. 7 is a diagram (part 3) illustrating an example of the processing performed by the control device according to the first embodiment in relation to the automatic parking.

Then, as illustrated in FIG. 7, the control device 30 determines whether there is an operation performed on the display button GD (step S15). When it is determined that there is an operation performed on the display button GD (Yes in step S15), the control device 30 proceeds to step S8 in FIG. 6 and displays the operation guide GO.

On the other hand, when it is determined that there is no operation performed on the display button GD (No in step S15), the control device 30 determines whether there is an operation performed on the selected candidate position image GFS (step S16). When the control device 30 determines that there is an operation performed on the selected candidate position image GFS (Yes in step S16), the control device 30 adjusts the position and the angle of the selected candidate position image GFS (step S18).

Further, when the control device 30 determines that there is no operation performed on the selected candidate position image GFS (No in step S16), the control device 30 determines whether there is an operation performed on any one of the adjustment buttons in the adjustment button group GB (step S17), and when it is determined that there is an operation performed on the adjustment button (Yes in step S17), the control device 30 adjusts the position and the angle of the selected candidate position image GFS (step S18).

That is, the user can adjust the display position of the selected candidate position image GFS by directly performing the touch operation on the selected candidate position image GFS (Yes in step S16, see step S18), or can adjust the display position of the selected candidate position image GFS by operating the adjustment button group GB (Yes in step S17, see step S18).

Then, the control device 30 determines whether there is an operation performed on the decision button BK (step S19), and when it is determined that there is an operation performed on the decision button BK (Yes in step S19), the control device 30 sets the position indicated by the selected candidate position image GFS as the parking position, starts the automatic parking to the parking position according to the selected parking pattern (step S20), and ends the series of processing.

As described above, the control device 30 (for example, the second display control unit 34) and the vehicle 1 can display the operation guide GO in the second display region D2 so as to be superimposed on the direction image PS2 when the candidate position image GF (specifically, the selected candidate position image GFS) is displayed, and can hide the operation guide GO when a predetermined operation (for example, the slide operation and the rotation operation) is performed on the candidate position image GF when the operation guide GO is displayed. Accordingly, the limited display region 21a can be effectively utilized and information necessary for the user can be presented to the user in an easy-to-understand manner.

Further, when any one of the operations guided by the operation guide GO for guiding two or more types of operations (for example, the slide operation and the rotation operation) is performed while the operation guide GO is displayed, the control device 30 (for example, the second display control unit 34) can hide the operation guide GO. Accordingly, when it is considered that the user knows the operation performed on the candidate position image GF, the operation guide GO can be hidden. In the above-described embodiment, two operations including the slide operation and the rotation operation are prepared as the operation performed on the candidate position image GF. For example, a pinch-out operation of displaying the surrounding of the candidate position image GF in an enlarged manner, a pinch-in operation of reducing and displaying the surrounding of the candidate position image GF, or the like may be enabled, and these operations may be guided by the operation guide GO.

Further, the control device 30 (for example, the second display control unit 34) can display the direction image including the landscape in the predetermined direction of the vehicle 1 in the second display region D2. Accordingly, the surrounding of the vehicle 1 can be guided to the user by the direction image PS2 in addition to the top view image PS1.

Further, when the candidate position image GF is displayed and the operation guide GO is hidden, the control device 30 (for example, the second display control unit 34) can display the display button GD for receiving an operation for displaying the operation guide GO in the second display region D2 in an operable state, and can display the operation guide GO in the second display region D2 when the display button GD is operated. Accordingly, even after the operation guide GO is hidden, the user can check the operation guide GO as necessary by operating the display button GD.

Further, the control device 30 (for example, the second display control unit 34) can display the hidden setting button BN for receiving an operation of setting to hide the operation guide GO in the second display region D2 in an operable state when the operation guide GO is displayed, and can hide the operation guide GO when the candidate position image GF is displayed next time in response to the operation on the hidden setting button BN. Accordingly, the operation guide GO can be prevented from being displayed against the user's intention.

Further, the control device 30 (for example, the first display control unit 33) can display the adjustment button group GB for receiving an operation of adjusting the display position of the candidate position image GF in the first display region D1 when the candidate position image GF is displayed, and can hide the adjustment button group GB when the operation guide GO is displayed. This allows the user to pay attention to the operation guide GO.

Further, the control device 30 (for example, the first display control unit 33) can adjust the display position of the candidate position image GF on the condition that the vehicle 1 stops. Accordingly, the user can be prevented from performing the operation of adjusting the display position of the candidate position image GF during the movement of the vehicle 1, and the safety of the vehicle 1 can be improved.

Second Embodiment

Next, a second embodiment according to the present invention will be described. In the following description, portions different from those of the first embodiment will be mainly described, and description of portions common to those of the first embodiment will be appropriately omitted or simplified.

For example, when the user adjusts a display position of the candidate position image GF by a touch operation, it is meaningless to display the adjustment button group GB in the first display region D1. Therefore, in the second embodiment, the control device 30 (for example, the first display control unit 33) displays the adjustment button group GB in response to receiving an operation for displaying the adjustment button group GB from a user.

Figure 8:
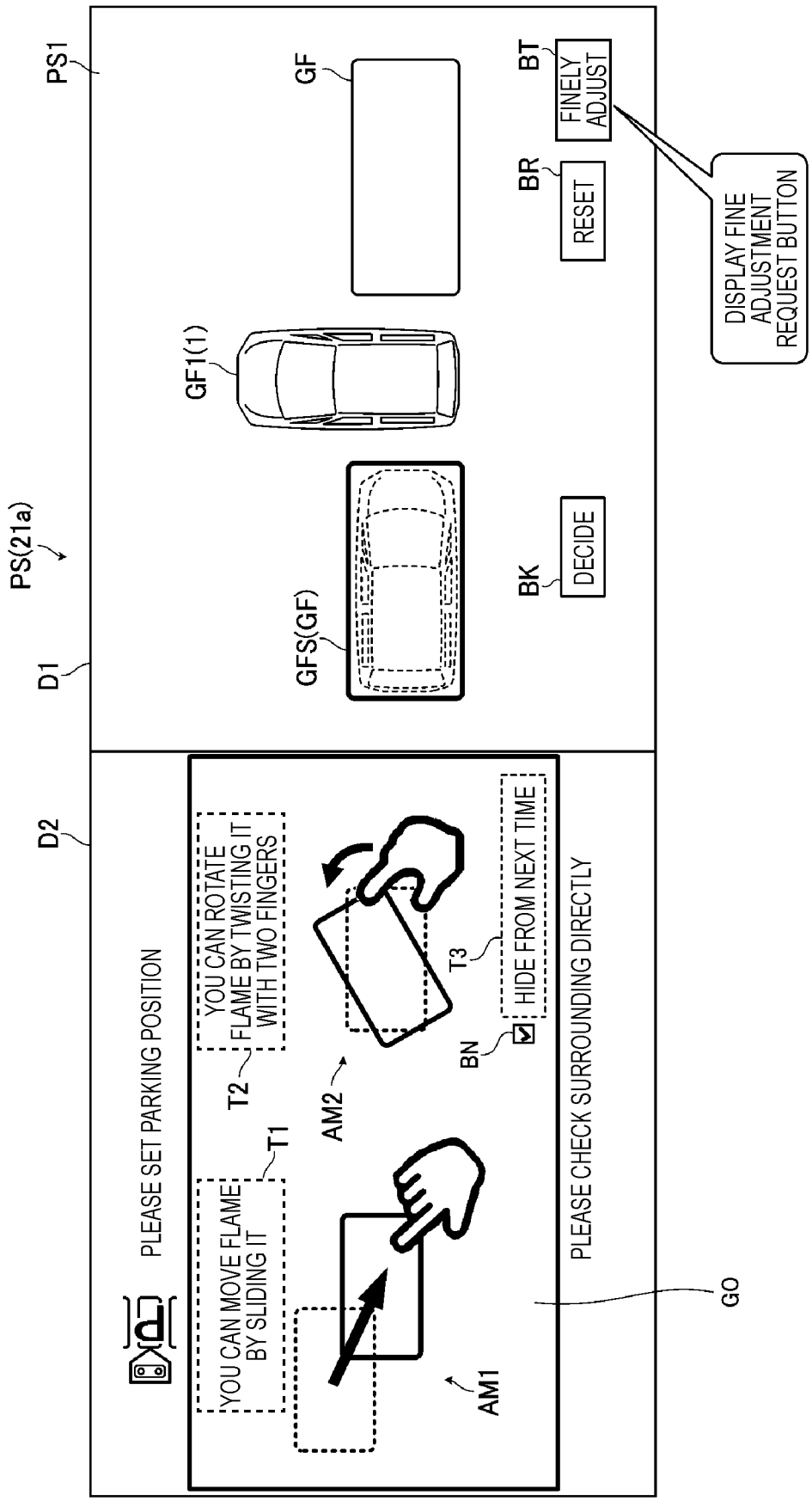
FIG. 8 is a diagram illustrating an example of an automatic parking related screen displayed by a control device according to a second embodiment in relation to automatic parking.

For example, after displaying the parking method selection image GS illustrated in FIG. 4, when there is an operation performed on any one of the parking pattern images GP, the control device 30 displays the automatic parking related screen PS illustrated in FIG. 8 on the touch panel 21 instead of the automatic parking related screen PS illustrated in FIG. 2.

In the first display region D1 of the automatic parking related screen PS illustrated in FIG. 8, a fine adjustment request button BT is further displayed as an operation button image for receiving an operation for displaying the adjustment button group GB. In this way, in the second embodiment, when the candidate position image GF is displayed, the control device 30 (for example, the first display control unit 33) displays the fine adjustment request button BT for receiving an operation for displaying the adjustment button group GB (that is, the adjustment button) in the first display region D1.

Figure 9:
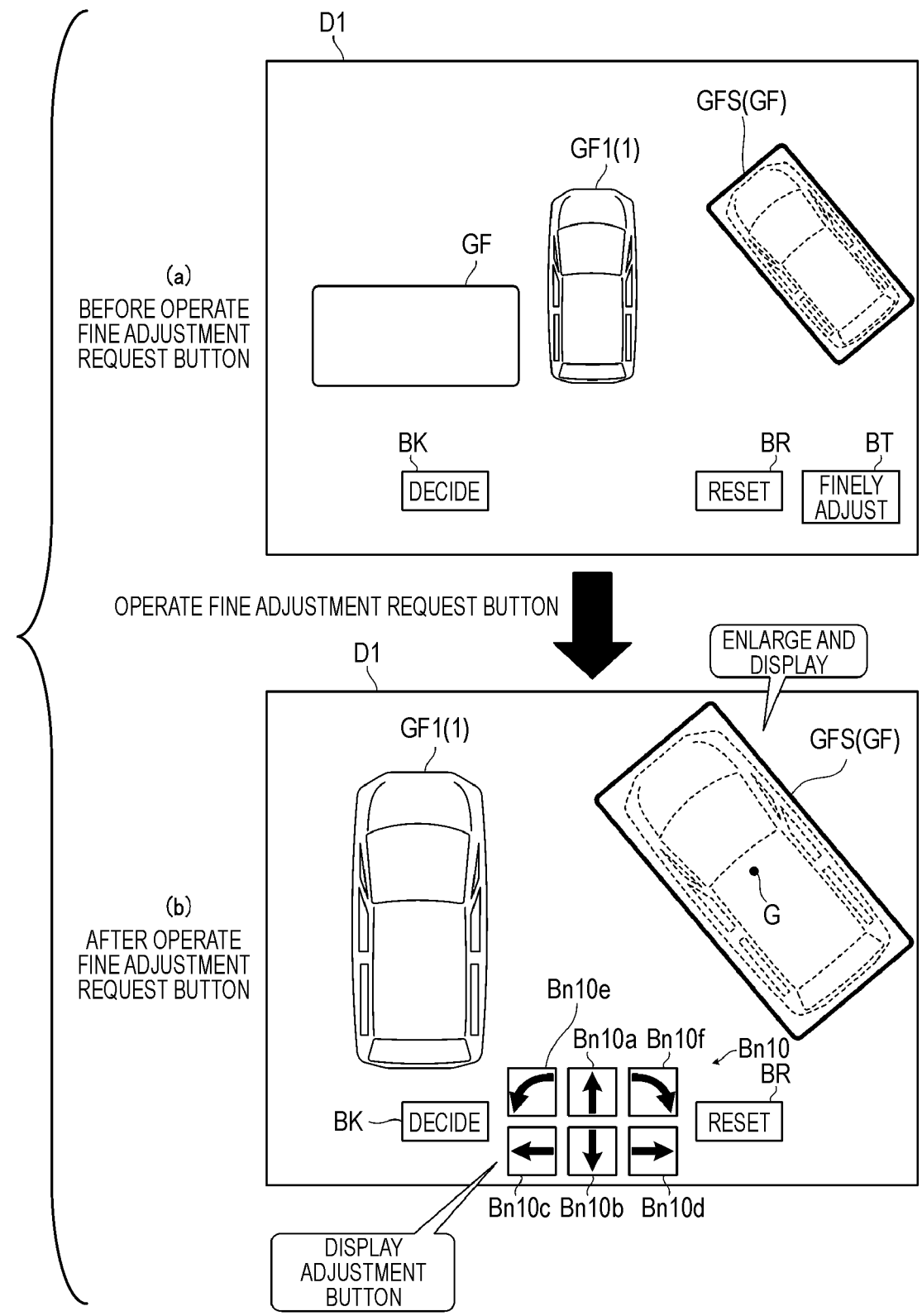
FIG. 9 is a diagram illustrating an example of a first display region before and after an operation of a fine adjustment request button according to the second embodiment.

Part (a) of FIG. 9 illustrates an example of the first display region D1 before the operation performed on the fine adjustment request button BT is performed, and part (b) of FIG. 9 illustrates an example of the first display region D1 after the operation performed on the fine adjustment request button BT is performed.

As illustrated in FIG. 9, when the fine adjustment request button BT is operated, the control device 30 displays the adjustment button group GB in the first display region D1. Accordingly, the adjustment button group GB can be displayed only when the user requires the adjustment button group GB (that is, adjustment buttons). Therefore, the limited display region 21a can be effectively utilized and information necessary for the user can be presented to the user in an easy-to-understand manner.

Further, as illustrated in FIG. 9, when the fine adjustment request button BT is operated, the control device 30 (for example, the first display control unit 33) preferably displays the top view image PS1 and the candidate position image GF (for example, the selected candidate position image GFS) in the first display region D1 in a further enlarged manner compared to a case before the fine adjustment request button BT is operated. In this way, it is possible to improve visibility of the top view image PS1 and the candidate position image GF in the first display region D1 when the user adjusts (for example, finely adjusts) the display position of the candidate position image GF by using the adjustment button group GB. Accordingly, it is possible to improve operability when the user adjusts the display position of the candidate position image GF by using the adjustment button group GB.

For example, when the fine adjustment request button BT is operated, the control device 30 (for example, the first display control unit 33) displays the top view image PS1 and the candidate position image GF in an enlarged manner in the first display region D1 with reference to the display position of the candidate position image GF (for example, the selected candidate position image GFS). For example, as illustrated in FIG. 9, the parking position indicated by the selected candidate position image GFS is on a right side of the vehicle 1. In this case, when the fine adjustment request button BT is operated, the control device 30 displays, in an enlarged manner, a portion of the top view image PS1 immediately before the fine adjustment request button BT is operated. The portion includes the host vehicle image GF1 and a right region of the vehicle 1. The control device 30 sets an enlargement ratio at this time to such an enlargement ratio with which at least a center position G of the selected candidate position image GFS is included in the first display region D1.

In this way, by displaying the top view image PS1 and the candidate position image GF in the first display region D1 in an enlarged manner with reference to the display position of the candidate position image GF (for example, the selected candidate position image GFS), the control device 30 can present the information necessary for the user to the user in an easy-to-understand manner when the display position of the candidate position image GF is adjusted by using the adjustment button group GB.

The control device 30 may set the enlargement ratio at the time of displaying the top view image PS1 and the candidate position image GF in an enlarged manner in the first display region D1 as large as possible within a range in which the center position G of the selected candidate position image GFS is included in the first display region D1. In this way, the top view image PS1 and the candidate position image GF in the first display region D1 can be displayed in a further enlarged manner according to the operation performed on the fine adjustment request button BT.

The control device 30 may set the enlargement ratio when the top view image PS1 and the candidate position image GF are displayed in the first display region D1 in an enlarged manner as large as possible within a range in which the entire selected candidate position image GFS is included in the first display region D1. In this way, even when the top view image PS1 and the candidate position image GF are displayed in the first display region D1 in an enlarged manner, it is possible to avoid a case where a part of the selected candidate position image GFS does not fit into the first display region D1.

As illustrated in FIG. 9, the control device 30 (for example, the first display control unit 33) may hide the fine adjustment request button BT when the fine adjustment request button BT is operated (that is, when the adjustment button group GB is displayed). Accordingly, the limited display region 21a can be effectively utilized and the information necessary for the user can be presented to the user in an easy-to-understand manner.

When the fine adjustment request button BT is operated, the control device 30 (for example, the first display control unit 33) may display the fine adjustment request button BT in a grayed-out state, for example, instead of hiding the fine adjustment request button BT, and may not receive an operation performed on the fine adjustment request button BT. Alternatively, when the fine adjustment request button BT is operated, for example, the control device 30 (for example, the first display control unit 33) may display, instead of the fine adjustment request button BT, another operation button image for receiving an operation for returning a display in part (b) of FIG. 9 to a display in part (a) of FIG. 9.

In the example described above, the control device 30 displays the top view image PS1 and the candidate position image GF in an enlarged manner in the first display region D1 with reference to the display position of the candidate position image GF (for example, the selected candidate position image GFS), and the present is not limited thereto.

For example, the control device 30 may display, in an enlarged manner, a predetermined portion of the top view image PS1 immediately before the fine adjustment request button BT is operated, and the predetermined portion is centered on the host vehicle image GF1. The control device 30 may display a predetermined region on the sides of the vehicle 1 in an enlarged manner with reference to the host vehicle image GF1. Further, the control device 30 may appropriately change the enlargement ratio or a display range in the first display region D1 in accordance with a change in the display position of the candidate position image GF (more specifically, the selected candidate position image GFS) after the top view image PS1 and the candidate position image GF in the first display region D1 are displayed in an enlarged manner.

Although the embodiments of the present invention are described above with reference to the accompanying drawings, it goes without saying that the present invention is not limited to such embodiments. It will be apparent to those skilled in the art that various changes or modifications may be conceived within the scope of the claims, and it is also understood that the various changes or modifications belong to the technical scope of the present invention. The respective constituent elements in the above embodiments may be combined as desired without departing from the gist of the invention.

For example, in the above-described embodiments, the touch panel 21 includes the horizontally long display region 21a, but the display region 21a may be vertically long. In this case, for example, an upper half region of the display region 21a may be used as the first display region D1, and a lower half region of the display region 21a may be used as the second display region D2.

In addition, in the above-described embodiments, an example in which the moving body according to the present invention is the vehicle 1 which is a four-wheeled automobile has been described, but the present invention is not limited thereto. The moving body according to the present invention may be a two-wheeled automobile (so-called motorcycle). Segway (registered trademark), a ship, an aircraft, or the like.

At least the following matters are described in the present specification. Although corresponding constituent elements and the like in the above embodiments are shown in parentheses, the present invention is not limited thereto.

(1) A control device (control device 30) for controlling a display device (touch panel 21) mounted on a moving body (vehicle 1), the moving body being configured to move to a target position designated by a user by automatic steering, the display device including a first display region (first display region D1) and a second display region (second display region D2) adjacent to the first display region, the control device includes:

a first display control unit (first display control unit 33) configured to display, in the first display region, a top view image (top view image PS1) of the moving body and surrounding of the moving body and a frame image (candidate position image GF) indicating a place set as the target position, the top view image being generated based on a surrounding image obtained by capturing an image of the surrounding of the moving body; and a second display control unit (second display control unit 34) configured to display a predetermined image different from the top view image in the second display region when the top view image and the frame image are displayed, in which the first display control unit is configured to adjust, when a predetermined operation is performed on the displayed frame image, a display position of the frame image according to the operation, and the second display control unit is configured to display, when the frame image is displayed, an operation guide (operation guide image GO) for guiding the predetermined operation in the second display region with the operation guide being superimposed on the predetermined image, and hide the operation guide after the predetermined operation is performed when the operation guide is displayed.

According to (1), the operation guide is displayed until the operation on the frame image is performed, the operation guide is hidden when the operation on the frame image is performed, and therefore the limited display region of the display device is effectively utilized and information necessary for the user can be presented to the user in an easy-to-understand manner.

(2) The control device according to (1), in which
the predetermined operation includes two or more types of operations different from each other,
the operation guide guides the two or more types of operations, and
the second display control unit hides the operation guide when any one of the two or more types of operations is performed while displaying the operation guide.

According to (2), when any one of the two or more types of operations guided by the operation guide is performed, the operation guide is hidden. Therefore, when it is considered that the user knows the operation on the frame image, the operation guide can be hidden.

(3) The control device according to (1) or (2), in which
the second display control unit displays a direction image (direction image PS2) as the predetermined image in the second display region, the direction image being generated based on the peripheral image and including a landscape in a predetermined direction from the moving body.

According to (3), the surrounding of the moving body can be guided to the user by the direction image in addition to the top view image.

(4) The control device according to any one of (1) to (3), in which
the second display control unit is configured to
display a display button (display button GD) in an operable state in the second display region when the frame image is displayed and the operation guide is hidden, the display button being a button for receiving an operation for displaying the operation guide, and
display the operation guide in the second display region when the display button is operated.

According to (4), even after the operation guide is hidden, the user can check the operation guide as necessary by operating the display button.

(5) The control device according to any one of (1) to (4), in which
the second display control unit is configured to
display a hidden setting button (hidden setting button BN) in an operable state in the second display region when the operation guide is displayed, the hidden setting button being a button for receiving an operation for setting the operation guide not to be displayed, and
hide the operation guide when the frame image is displayed next time in response to an operation of the hidden setting button.

According to (5), the operation guide can be prevented from being displayed against the user's intention.

(6) The control device according to any one of (1) to (5), in which
the first display control unit is configured to
display an adjustment button (up button Bn10a, down button Bn10b, left button Bn10c, right button Bn10d, left rotation button Bn 10e, and right rotation button Bn10f) in the first display region when displaying the frame image, the adjustment button being a button for receiving an operation for adjusting the display position of the frame image, the operation being different from the predetermined operation, and
hide the adjustment button when the operation guide is displayed.

According to (6), when the operation guide is displayed, the adjustment button is hidden, and therefore the user can pay attention to the operation guide.

(7) The control device according to any one of (1) to (6), in which
the first display control unit is configured to adjust the display position of the frame image on a condition that the moving body stops.

According to (7), since the display position of the frame image can be adjusted on a condition that the moving body stops, the user can be prevented from performing the operation of adjusting the display position of the frame image during the movement of the moving body, and the safety of the moving body can be improved.

(8) The control device according to any one of (1) to (5) and (7), in which
the first display control unit is configured to
display a fine adjustment request button (fine adjustment request button BT) in the first display region when displaying the frame image, the fine adjustment request button being a button for receiving an operation for displaying a predetermined adjustment button (up button Bn10a, down button Bn10b, left button Bn10c, right button Bn10d, left rotation button Bn10e, and right rotation button Bn10f), and
display the adjustment button in the first display region when the fine adjustment request button is operated, the adjustment button being a button for receiving an operation for adjusting the display position of the frame image, the operation being different from the predetermined operation.

According to (8), the adjustment button can be displayed only when the user requires the adjustment button. Therefore, the limited display region can be effectively utilized and the information necessary for the user can be presented to the user in an easy-to-understand manner.

(9) The control device according to (8), in which
the first display control unit is configured to
display, when the fine adjustment request button is operated, the top view image and the frame image in the first display region in a further enlarged manner compared to a case before the fine adjustment request button is operated.

According to (9), it is possible to improve visibility of the top view image and the frame image in the first display region when the user adjusts (for example, finely adjusts) the display position of the frame image by using the adjustment button. Accordingly, it is possible to improve operability when the user adjusts the display position of the frame image by using the adjustment button.

(10) The control device according to (9), in which
the first display control unit is configured to
display, when the fine adjustment request button is operated, the top view image and the frame image in the first display region in an enlarged manner with reference to the display position of the frame image.

According to (10), when the display position of the frame image is adjusted by using the adjustment button, the information necessary for the user can be presented to the user in an easy-to-understand manner.

(11) A moving object includes: the control device according to any one of (1) to (10).

According to (11), the operation guide is displayed until the operation on the frame image is performed, the operation guide is hidden when the operation on the frame image is performed, and therefore the limited display region of the display device is effectively utilized and the information necessary for the user can be presented to the user in an easy-to-understand manner.

What is claimed is:
1. A control device for controlling a display device mounted on a moving body, the moving body being configured to move to a target position designated by a user by automatic steering, the display device including a first display region and a second display region adjacent to the first display region, the control device comprising a processing circuitry configured to:
display, in the first display region, a top view image of the moving body and an area surrounding the moving body and a frame image indicating a place set as the target position, the top view image being generated based on a surrounding image obtained by capturing an image of the area surrounding the moving body; and display a predetermined image different from the top view image in the second display region when the top view image and the frame image are displayed;
adjust, in response to a predetermined operation being performed on the displayed frame image, a display position of the frame image according to the predetermined operation;
display, when the frame image is displayed, an operation guide indicating the predetermined operation in the second display region with the operation guide being superimposed on the predetermined image; and
hide the operation guide after the predetermined operation is performed when the operation guide is displayed, wherein the processing circuitry is further configured to
display a display button in an operable state in the second display region based on the frame image being displayed and the operation guide being hidden, and
when the frame image is displayed and the operation guide is hidden, display the operation guide in the second display region in response to an operation being performed on the display button.

2. The control device according to claim 1, wherein
the predetermined operation includes a first operation and a second operation different from each other,
the operation guide indicates the first operation and the second operation, and
the processing circuitry hides the operation guide when any one of the first operation and the second operation is performed while displaying the operation guide.

3. The control device according to claim 1, wherein
the processing circuitry displays a direction image as the predetermined image in the second display region, the direction image being generated based on the surrounding image and including a landscape in a predetermined direction from the moving body.

4. The control device according to claim 1, wherein
the processing circuitry is configured to adjust the display position of the frame image on a condition that the moving body stops.

5. A moving object comprising the control device according to claim 1.

6. A control device for controlling a display device mounted on a moving body, the moving body being configured to move to a target position designated by a user by automatic steering, the display device including a first display region and a second display region adjacent to the first display region, the control device comprising a processing circuitry configured to:
display, in the first display region, a top view image of the moving body and an area surrounding the moving body and a frame image indicating a place set as the target position, the top view image being generated based on a surrounding image obtained by capturing an image of the area surrounding the moving body;
display a predetermined image different from the top view image in the second display region when the top view image and the frame image are displayed;
adjust, in response to a predetermined operation being performed on the displayed frame image, a display position of the frame image according to the predetermined operation;
display, when the frame image is displayed, an operation guide indicating the predetermined operation in the second display region with the operation guide being superimposed on the predetermined image; and
hide the operation guide based on the predetermined operation being performed when the operation guide is displayed, wherein
the processing circuitry is further configured to
display a hidden setting button in an operable state in the second display region based on the operation guide being displayed, and
when the operation guide is displayed, set the operation guide not to be displayed, and hide the operation guide in response to an operation being performed on the hidden setting button.

7. A moving object comprising the control device according to claim 6.

8. A control device for controlling a display device mounted on a moving body, the moving body being configured to move to a target position designated by a user by automatic steering, the display device including a first display region and a second display region adjacent to the first display region, the control device comprising a processing circuitry configured to:
display, in the first display region, a top view image of the moving body and an area surrounding the moving body and a frame image indicating a place set as the target position, the top view image being generated based on a surrounding image obtained by capturing an image of the area surrounding the moving body;
display a predetermined image different from the top view image in the second display region when the top view image and the frame image are displayed;
adjust, in response to a predetermined operation being performed on the displayed frame image, a display position of the frame image according to the predetermined operation;
display, when the frame image is displayed, an operation guide indicating the predetermined operation in the second display region with the operation guide being superimposed on the predetermined image; and
hide the operation guide after the predetermined operation is performed when the operation guide is displayed, wherein
the processing circuitry is further configured to
display an adjustment button in the first display region based on the frame image being displayed,
when the frame image is displayed, adjust the display position of the frame image in response to an operation being performed on the adjustment button, the operation being different from the predetermined operation, and
hide the adjustment button based on the operation guide being displayed.

9. A moving object comprising the control device according to claim 8.

10. A control device for controlling a display device mounted on a moving body, the moving body being configured to move to a target position designated by a user by automatic steering, the display device including a first display region and a second display region adjacent to the first display region, the control device comprising a processing circuitry configured to:
display, in the first display region, a top view image of the moving body and an area surrounding the moving body and a frame image indicating a place set as the target position, the top view image being generated based on a surrounding image obtained by capturing an image of the area surrounding the moving body;

display a predetermined image different from the top view image in the second display region when the top view image and the frame image are displayed;

adjust, in response to a predetermined operation being performed on the displayed frame image, a display position of the frame image according to the predetermined operation;

display, when the frame image is displayed, an operation guide indicating the predetermined operation in the second display region with the operation guide being superimposed on the predetermined image; and hide the operation guide after the predetermined operation is performed when the operation guide is displayed, wherein the processing circuitry is further configured to display a fine adjustment request button in the first display region based on the frame image being displayed, display a predetermined adjustment button in response to a first operation being performed on the fine adjustment request button, and adjust the display position of the frame image in response to a second operation being performed on the predetermined adjustment button, the first operation and the second operation being different from the predetermined operation.

11. The control device according to claim 10, wherein the processing circuitry is configured to display, when the fine adjustment request button is operated, the top view image and the frame image in the first display region in an enlarged manner compared to a case before the fine adjustment request button is operated.

12. The control device according to claim 11, wherein the processing circuitry is configured to display, when the fine adjustment request button is operated, the top view image and the frame image in the first display region in the enlarged manner with reference to the display position of the frame image.

13. A moving object comprising the control device according to claim 10.

* * * * *